(12) United States Patent
Yin et al.

(10) Patent No.: US 10,763,474 B1
(45) Date of Patent: Sep. 1, 2020

(54) BATTERY LOCK-UP DEVICE, NEW ENERGY VEHICLE, AND METHOD FOR INSTALLING/DETACHING POWER BATTERY

(71) Applicant: NIO NEXTEV LIMITED, Hong Kong (CN)

(72) Inventors: Changjiu Yin, Hong Kong (CN); Haitao Zhu, Hong Kong (CN)

(73) Assignee: NIO NEXTEV LIMITED, Hong Kong (CN)

( * ) Notice: Subject to any disclaimer, the term of this patent is extended or adjusted under 35 U.S.C. 154(b) by 435 days.

(21) Appl. No.: 15/751,740

(22) PCT Filed: Jun. 14, 2017

(86) PCT No.: PCT/CN2017/088293
§ 371 (c)(1),
(2) Date: Feb. 9, 2018

(87) PCT Pub. No.: WO2018/028301
PCT Pub. Date: Feb. 15, 2018

(30) Foreign Application Priority Data

Aug. 10, 2016 (CN) .......................... 2016 1 0649233

(51) Int. Cl.
*H01M 2/10* (2006.01)
*B60K 1/04* (2019.01)
(Continued)

(52) U.S. Cl.
CPC ............. *H01M 2/1083* (2013.01); *B60K 1/04* (2013.01); *B60L 50/66* (2019.02); *B60L 53/80* (2019.02);
(Continued)

(58) Field of Classification Search
CPC ...... H01M 2/1083; B60L 50/66; B60L 53/80; B60K 1/04
See application file for complete search history.

(56) References Cited

U.S. PATENT DOCUMENTS 8,915,321 B2 * 12/2014 Lejeune .............. H01M 2/1083
180/68.5
2012/0321381 A1 * 12/2012 Ohgitani .................. B60K 1/04
403/376

FOREIGN PATENT DOCUMENTS

CN 202138211 2/2012
CN 101727993 6/2012
(Continued)

OTHER PUBLICATIONS

International Search Report and Written Opinion prepared by the State Intellectual Property Office of the P.R.C. dated Aug. 22, 2017 for International Application No. PCT/CN2017/088293.
(Continued)

*Primary Examiner* — Stewart A Fraser
(74) *Attorney, Agent, or Firm* — Sheridan Ross P.C.

(57) ABSTRACT

The invention refers to a battery lock-up device, a new energy vehicle comprising the battery lock-up device, and a method for installing/detaching a power battery. The battery lock-up device comprises: a connection bracket having a first connection hole and a dual limited position structure; a housing structure having a second connection hole; a press plate and a nut, the press plate comprising a head portion and a pillar portion passing through the first connection hole and the second connection hole, the pillar portion being formed with a threaded portion for engaging with the nut and having a distal end adapted to mate with a rotational operation tool; and an anti-rotation locking member which locks the nut against the housing structure. When the press plate is in the first limited position, the press plate and the nut which is
(Continued)

engaged on the threaded portion lock-up the connection bracket and the housing structure; and when the press plate reaches the second limited position, the head portion of the press plate can exit via the first connection hole so as to realize unlocking. The invention applies to a situation of detaching and installing the battery quickly. By retaining only the locking function and quick detaching/installing function on the new energy vehicle, the mechanical structure is simplified, arrangement space is reduced, the cost of a single vehicle is reduced, and the reliability is improved.

20 Claims, 6 Drawing Sheets (51) Int. Cl.
    *B60L 53/80*     (2019.01)
    *B60L 50/60*     (2019.01)

(52) U.S. Cl.
    CPC . *B60K 2001/0455* (2013.01); *H01M 2220/20* (2013.01)

(56) References Cited

FOREIGN PATENT DOCUMENTS

| | | |
|---|---|---|
| CN | 102529667 | 7/2012 |
| CN | 104015702 | 9/2014 |
| CN | 104022240 | 9/2014 |
| CN | 204175767 | 2/2015 |
| CN | 106058109 | 10/2016 |
| CN | 205823862 | 12/2016 |
| CN | 206250236 | 6/2017 |
| JP | 2010-188472 | 9/2010 |
| WO | WO 2011/055687 | 5/2011 |

OTHER PUBLICATIONS

Extended Search Report for European Patent Application No. 17835441.1, dated Jul. 24, 2019, 9 pages.

Official Action for China Patent Application No. 201610649233.3, dated Apr. 13, 2018, 5 pages.

* cited by examiner

BATTERY LOCK-UP DEVICE, NEW ENERGY VEHICLE, AND METHOD FOR INSTALLING/DETACHING POWER BATTERY

CROSS REFERENCE TO RELATED APPLICATIONS

This application is a national stage application under 35 U.S.C. 371 and claims the benefit of PCT Application No. PCT/CN2017/088293 having an international filing date of 14 Jun. 2017, which designated the United States, which PCT application claimed the benefit of China Patent Application No. 201610649233.3 filed 10 Aug. 2016, the disclosure of each of which are incorporated herein by reference.

FIELD OF THE INVENTION

The invention relates to the technical field of new energy vehicle, and in particular, to a battery lock-up device for new energy vehicle.

Furthermore, the invention also relates to a new energy vehicle that comprises the battery lock-up device, and a method for installing/detaching a power battery onto/from a new energy vehicle by using the battery lock-up device.

BACKGROUND

New energy automobile is a typical type of new energy vehicle. In existing plug-in new energy automobiles, the power battery of the automobile has to wait for a long time before being charging, and an inappropriate operation is prone to affect the service life of battery.

A battery swap new energy automobile represents a trend of the development in the future. In order to meet the requirements for the business mode of battery swap of new energy automobile, such a battery swap technology realizes a quick detachment, replacement and lock-up of the power battery via a battery swap platform in a battery swap station. In existing battery swap technologies, it is common to install a drive motor for battery swap in the automobile. After the battery is fed in place by the battery swap platform, the drive motor for battery swapping on the automobile is used to perform an installing/detaching operation on the power battery. However, currently in the market, there is no mature product of the same kind that can be put into large scale mass production.

In existing battery swapping technologies, such a method of quick swapping of power battery by using on-board drive motor for battery swap for driving involves many elements and components, a complicated structure, a poor reliability, a large space occupation, and an increment in the cost of a single automobile.

SUMMARY OF THE INVENTION

An object of the invention is to provide a battery lock-up device which has a simple and compact structure, a good reliability, a high utilization rate of space, and is cost effective.

Further, an object of the invention is also to provide a new energy vehicle comprising the above battery lock-up device, and a method for installing/detaching a power battery onto/from a new energy vehicle by using the battery lock-up device.

In order to realize the above objects, a first aspect of the invention provides a battery lock-up device for new energy vehicle, wherein the battery lock-up device comprises: a connection bracket adapted to be connected to the new energy vehicle, the connection bracket having a first connection hole and a dual limited position structure located at the first connection hole, the dual limited position structure comprising a first limited position and a second limited position;

a housing structure adapted to be fixed to a power battery of the new energy vehicle, the housing structure having a second connection hole;

a press plate and a nut, the press plate having a head portion and a pillar portion extending from the head portion and adapted to pass through the first connection hole and the second connection hole, the pillar portion being formed with a threaded portion for engaging with the nut and having a distal end adapted to mate with a rotational operation tool; and a detachable anti-rotation locking member locking the nut against the housing structure;

wherein when the press plate is at the first limited position, the press plate and the nut which is engaged on the threaded portion lock up the connection bracket and the housing structure; when the press plate reaches the second limited position, the head portion of the press plate can exit from the connection bracket via the first connection hole so that the connection bracket and the housing structure are unlocked.

Optionally, in the above battery lock-up device, the anti-rotation locking member is of a circular cover shape, and comprises a cover plate and a circumferential side wall extending from a first side of the cover plate, an inner circumference surface of the side wall and an outer circumference surface of the nut are adapted to be in form-fit with clearance so that a relative rotation thereof is prevented;

the cover plate has a flange extending to the outside of the circumferential side wall, and an outer circumference of the flange is formed with a holding portion adapted to engage with the housing structure;

an anti-rotation defining structure is formed at a position where an outer circumference surface of the circumferential side wall and the flange are joined, the anti-rotation defining structure engages with the housing structure so that a relative rotation thereof is prevented; and a traction structure is formed at a second side of the cover plate.

Optionally, in the above battery lock-up device, a chamfer for guiding purpose is formed at an inner side of a distal end of the circumferential side wall of the anti-rotation locking member.

Optionally, in the above battery lock-up device, the housing structure has a circular top plate and a circumferential side wall extending from one side of the top plate, a distal end of the circumferential side wall of the housing structure is formed with an outward turn-up, and a circumferential outer side face of the turn-up is formed with a circumferentially extending groove; the holding portion on the flange of the anti-rotation locking member is an inner turn-up adapted to engage with the groove and arranged in sections.

Optionally, in the above battery lock-up device, the anti-rotation defining structure is cone teeth which are in form-fit with cone slots distributed along the inner circumference at the turn-up of the housing structure. In the battery lock-up device configured in this way, the cone teeth and the cone slots can realize a dual function of anti-rotation and guidance simultaneously.

Optionally, in the above battery lock-up device, the traction structure is a groove or through hole having an internal thread.

Optionally, in the above battery lock-up device, the connection bracket has a first side wall and a second side wall that substantially perpendicular to each other, wherein the first side wall is formed with an installation hole for connecting to the new energy vehicle, and the second side wall is provided with the dual limited position structure and the first connection hole.

Optionally, in the above battery lock-up device, the first connection hole and a bottom face of the head portion of the press plate have consistent long quadrilateral shapes.

Optionally, in the above battery lock-up device, the first limited position is an anti-loosening groove in the surface of the second side wall that is perpendicular to the first connection hole, and the second limited position is a shoulder for maintaining the head portion of the press plate to align with the first connection hole.

Optionally, in the above battery lock-up device, the distal end of the pillar portion has a truncated multilateral pyramid shape.

In order to realize the above objects, a second aspect of the invention provides a new energy vehicle, which has a power battery installed by using the battery lock-up device according to any item in the above first aspect.

Optionally, in the above new energy vehicle, the new energy vehicle is a new energy automobile.

Optionally, in the above new energy vehicle, the connection bracket of the battery lock-up device is connected to the body of the new energy automobile, and/or the housing structure of the battery lock-up device is fixed to a battery housing of the power battery.

In order to realize the above objects, a third aspect of the invention provides a method for installing/detaching a power battery onto/from a new energy vehicle by using the battery lock-up device according to any item of the above first aspect, wherein the installing steps comprise: (1) bringing a power battery having the battery lock-up device to an installation position; (2) rotating the press plate of the power battery so that the press plate is aligned with the first connection hole of the connection bracket; (3) passing the head portion of the press plate through the first connection hole and using the rotational operation tool to rotate the press plate until the head portion of the press plate into the first limited position; (4) tightening the nut; and (5) installing the anti-rotation locking member between the housing structure and the nut; and/or, the detaching steps comprise: (1) detaching the anti-rotation locking member, (2) loosening the nut; (3) pushing the press plate upwardly; (4) using the rotational operation tool to rotate the head portion of the press plate to the second limited position; and (5) lowering the battery lock-up device and the power battery and then removing them.

The invention applies to a situation of detaching and installing the battery quickly. By maintaining only the locking function and quick detaching/installing function on the new energy vehicle such as automobile, the driving function of motor can be transferred to a mating battery swap device, thus simplifying the mechanical structure, reducing the arrangement space, lowering the cost of a single automobile, and improving the reliability.

BRIEF DESCRIPTION OF THE DRAWINGS

The disclosure of the invention will become more apparent with reference to the accompanying drawings. It should be understood that these drawings are merely provided for the purpose of illustration, and are not intended to limit the scope of protection of the invention, wherein.

DETAILED DESCRIPTION OF THE INVENTION

Specific embodiments of the invention will be described below in details with reference to the accompanying drawings. In various drawings, identical or corresponding technical features are denoted by identical reference signs, and the drawings are not necessarily drawn to scale.

Figure 1:
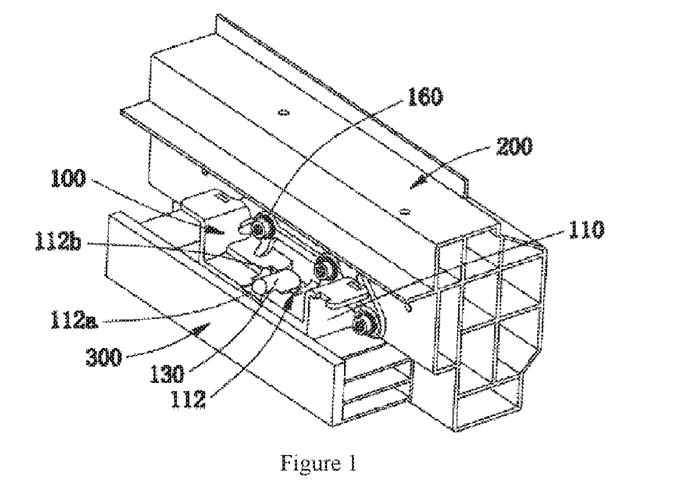
FIG. 1 is a schematic perspective view of the structure of a battery lock-up device for new energy vehicle according to an embodiment of the invention, in a state in which a battery housing of the power battery is connected to the new energy vehicle.
Figure 2:
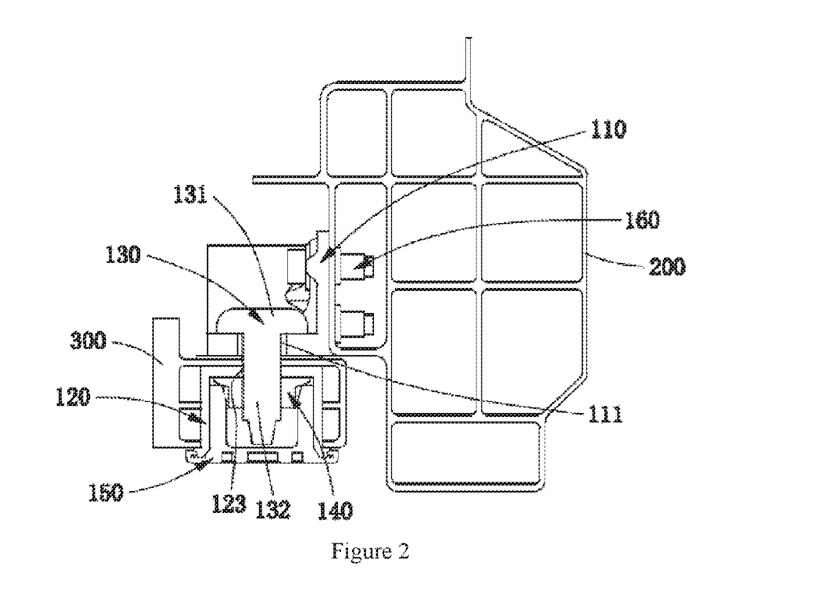
FIG. 2 is a schematic sectional view of the battery lock-up device of FIG. 1 along the A-A direction.

FIG. 1 is a schematic perspective view of the structure of a battery lock-up device for new energy vehicle according to an embodiment of the invention, in a state in which a battery housing of the power battery is connected to the new energy vehicle. FIG. 2 is a schematic sectional view of the battery lock-up device of FIG. 1 along an A-A direction.

It can be seen from the combination of FIGS. 1 and 2 that, the battery lock-up device 100 installs a power battery (not shown) of a new energy vehicle (e.g., new energy automobile, the same also applies hereinafter) to the new energy vehicle (not shown) by using a battery housing 300 and an automobile body 200. It should be noted that in the drawings, a battery frame and a threshold of automobile body are schematically taken as the corresponding portions on the battery housing and the automobile body for connecting with the battery lock-up device 300, respectively. It should be understood that in different embodiments, other portions of the power battery housing and/or other portions of the automobile body (especially the chassis of automobile body) can be selected for realizing the installation of the power battery 100.

It can be seen from the combination of FIGS. 1 and 2 that, the battery lock-up device 100 according to the illustrated embodiment of the invention can comprise a connection bracket 110, a housing structure 120, a press plate 130, a nut 140, an anti-rotation locking member 150, etc.

As shown, the connection bracket 110 of the battery lock-up device 100 is connected to the threshold of automobile body via a bolt assembly 160 so as to be connected to the new energy vehicle. Undoubtedly, those skilled in the art can also conceive other ways of fixing the connection bracket 110 to the new energy vehicle, including but not limited to, welding, riveting or the like. The usage of bolt assembly has an advantage in that is it detachable. The connection bracket 110 is also provided with a first connection hole 111 and a dual limited position structure 112 located at the first connection hole 111. As can be seen from drawings, the dual limited position structure 112 comprises a first limited position 112a and a second limited position 112b, which can be seen more clearly in FIG. 4.

In an alternative embodiment, the housing structure 120 can be fixed to the power battery of the new energy vehicle by way of, for example but not limited to, welding, or can be fixed to the battery housing 300 of the power battery, so that the internal structure of the power battery itself will not be contacted, thus avoiding an influence on the performance of the power battery. The housing structure 120 has a second connection hole 123.

In particular, as can be seen in FIG. 2, the press plate 130 comprises a head portion 131 and a pillar portion 132 extending from the head portion 131. In the assembled state as shown, the pillar portion 132 extends through the first connection hole 111 and the second connection hole 123, and has the nut 140 connected thereto. Therefore, it can be conceived that a threaded portion for engaging with the nut 140 is formed on the pillar portion 132, especially on a middle section of the pillar portion 132, and the pillar portion 132 has a distal end adapted to mate with a rotational operation tool.

The anti-rotation locking member 150 is detachable, and locks the nut 140 against the housing structure 120. In the illustrated embodiment, the anti-rotation locking member 150 is engaged between the housing structure 120 and the nut 140 via a form-fit so that the nut 140 is prevented from rotating relative to the housing structure 120; since the housing structure 120 is fixed relative to the battery housing 300, the nut 140 cannot rotate in the illustrated state, thus advantageously realizing the effect of locking and anti-loosening.

When the press plate 130 is in the first limited position 112a, the press plate 130 cannot rotate relative to the connection bracket 110. Therefore, the press plate 130 and the nut 140 that is engaged in the thread portion lock the connection bracket 110 and the housing structure 120, and no loosening would occur (e.g., the state as shown in FIGS. 1 and 2).

When the press plate 130 reaches the second limited position 112b, the head portion 131 of the press plate 130 can exit from the connection bracket 110 via the first connection hole 111 so that the connection bracket 110 and the housing structure 120 are unlocked. This situation can be realized in the following way: removing the anti-rotation locking member 150, and loosening the nut 140 so that the nut 140 is moved downwardly relative to the pillar portion 132 of the press plate 130 by a certain distance, then using an operation tool to push the press plate 130 upwardly away from the first limited position 112a and rotate the press plate 130 to the second limited position 112. As can be seen, the shape of the first connection hole 111 is configured such that when in the first limited position 112a, the head portion 131 of the press plate 130 is not allowed to pass through the first connection hole 111, whereas when in the second limited position 112b, the head portion 131 of the press plate 130 is allowed to pass through the first connection hole 111.

As can be seen, the invention applies a threaded fastening manner in cooperation with anti-rotation and sealing, the working principle is as followed: the housing structure 120 is nested into the battery housing 300, the press plate 130 secures the battery housing 300 with the automobile body 200 via the bolt 140, and the anti-rotation locking member 150 locks-up the locked nut 140 so as to realize anti-loosening. With the mechanical structure connected by thread, a quick replacing and locking of the power battery can be realized without having to completely loosening the nut 140.

Figure 3A:
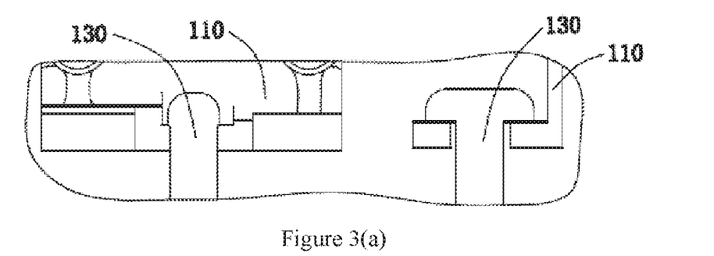
FIGS. 3(a), 3(b), 3(c) and 3(d) show steps of a quick battery swap operation process performed by using the battery lock-up device in FIG. 1, respectively.
Figure 3B:
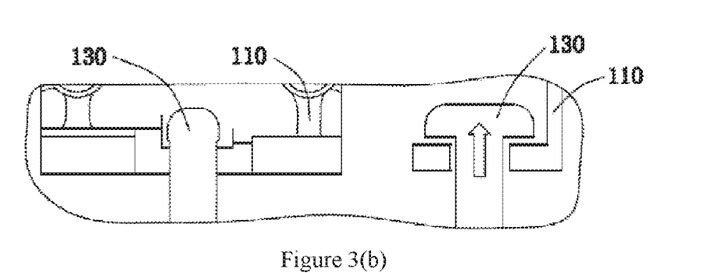
Figure 3C:
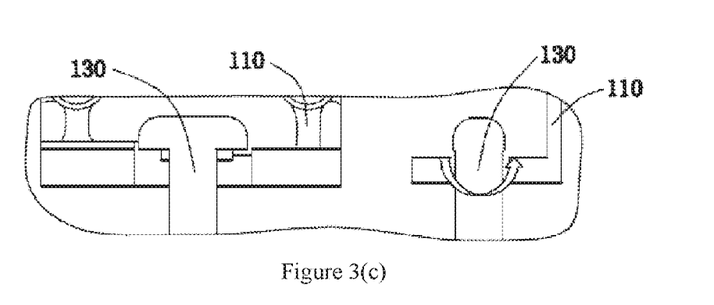
Figure 3D:
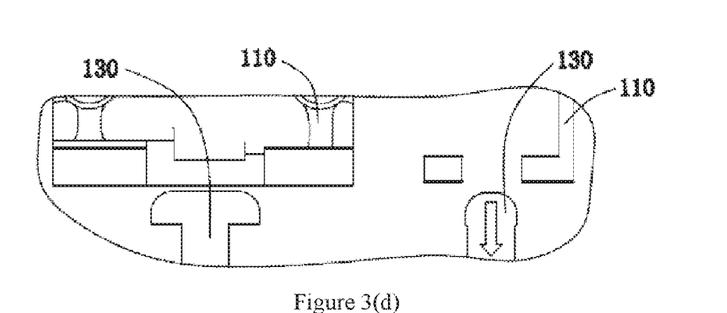

FIGS. 3(a), 3(b), 3(c) and 3(d) show steps of a quick battery swap operation process performed by using the battery lock-up device of FIG. 1, respectively;

The operation process of FIGS. 3(a) to 3(d) show a transition from a locked state to a loosened state. Specifically, the press plate 130 in FIG. 3(a) is in a locked state, in which the press plate 131 is securely snap-fit in the first limited position 112a of the connection bracket 110; FIG. 3(b) shows an upward lift of the press plate 130, in which the press plate 130 moves away from the first limited position 112a of the connection bracket 110 (in the illustrated example, the first limited position 112a is in a form of anti-rotation snap-fit groove for the press plate); the press plate 130 in FIG. 3(c) is rotated by 90° to reach an disengaged position of the press plate 130 and the connection bracket 110, i.e., the second limited position 112b; the battery housing 300 in FIG. 3(d) brings the press plate 130 downwardly so that the power battery is disengaged from the automobile body 200. The arrows in FIGS. 3(b) to 3(d) show a movement or rotation direction of the press plate 130, respectively.

On the contrary, the operation process of FIGS. 3(a) to 3(d) shows a transition from the loosened state to the locked state. It can be understood that in the process from the loosened state to the locked state, the movement or rotation direction of the press plate 130 has to take the opposite direction to the arrows in FIGS. 3(b) to 3(d).

Figure 4:
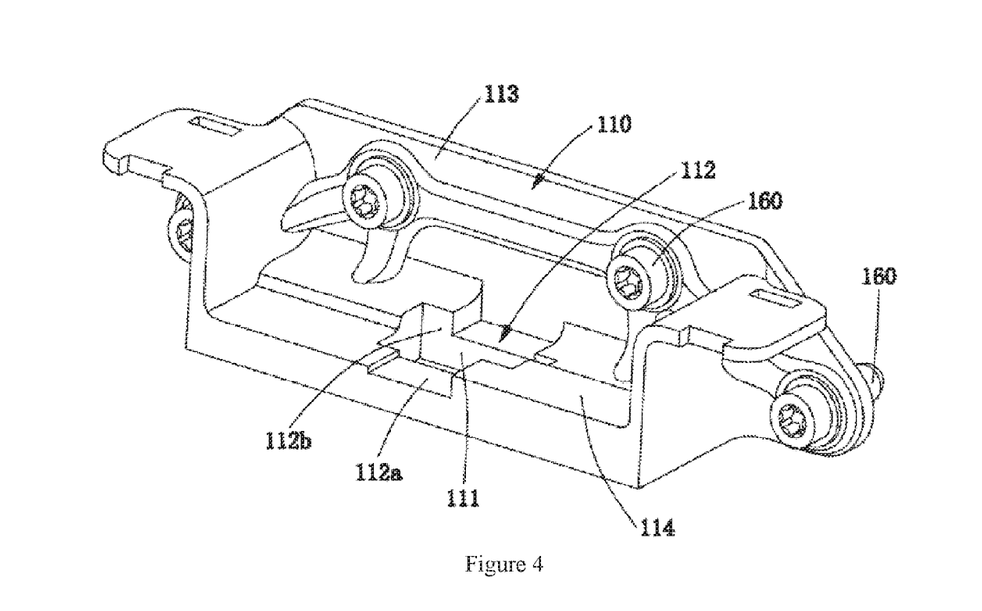
FIG. 4 is a schematic perspective view of a connection bracket of the battery lock-up device in FIG. 1.

FIG. 4 is a schematic perspective view of the connection bracket of the battery lock-up device in FIG. 1.

In the illustrated embodiment, the connection bracket 110 can have a first side wall 113 and a second side wall 114 that are substantially perpendicular to each other, wherein the first side wall 113 is adapted to be connected to the new energy vehicle, whereas the second side wall 114 is adapted to be connected to the press plate 130.

As shown, the first side wall 113 of the connection bracket is formed with four installation holes for connecting to the new energy vehicle, and bolt assemblies 160 pass through the installation holes so as to be installed onto the new energy vehicle. It can be understood that in an alternative embodiment, those skilled in the art can conceive employing other numbers of the installation holes and bolt assemblies; likewise, those skilled in the art can also employ other common connection methods to fix the connection bracket 110 to the new energy vehicle via the first side wall 113.

As shown, the second side wall 114 of the connection bracket is formed with the dual limited position structure 112 and the first connection hole 111. In the present embodiment, the first connection hole 111 and a bottom face of the head portion 131 of the press plate 130 can have consistent long quadrilateral shapes so that when they are aligned, the head portion 131 of the press plate 130 can exit via the first connection hole 111. It can be understood that in this situation, the first connection hole 111 is required to be at least slightly larger than the head portion 131 of the press plate 130. The long quadrilateral shape as shown has the advantage of easy machining. In the dual limited position structure 112, the first limited position 112a can be an anti-loosening groove on the surface of the second side wall perpendicular to the first connection hole, which serves as the anti-loosening limited position in the locked state; and the second limited position 112b is a shoulder for maintaining the head portion 131 of the press plate 130 aligned with the first connection hole 111, which serves as the limited position of the press plate 130 during detaching, for preventing phase disorder of the press plate. Such dual limited position structure 112 of the connection bracket 110 can realize a small-travel lift and prevent disorder of the press plate; during detaching, the press plate has a small lift travel, and it is only required to exceed the first limited position 112a (the height of side wall of the anti-loosening groove in the illustrated embodiment). As such, the length of the threaded part of the pillar portion 132 of the press plate 130 is enabled to be shortened, which not only facilitates machining, but also facilitates operation.

Figure 5A:
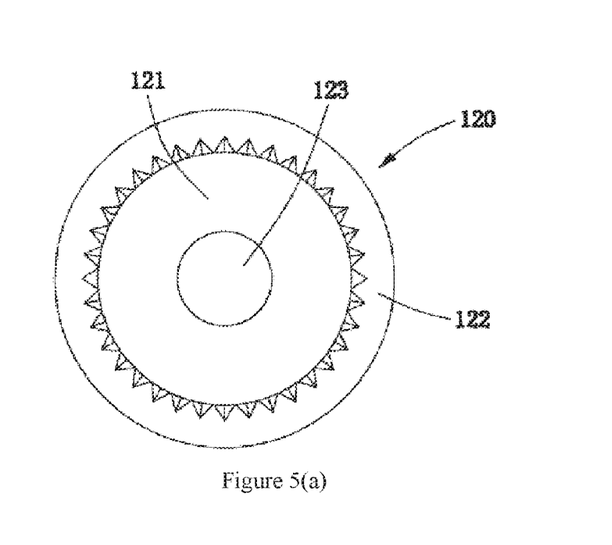
FIGS. 5(a) and 5(b) are schematic bottom view and side sectional view of a housing structure of the battery lock-up device in FIG. 1, respectively.
Figure 5B:
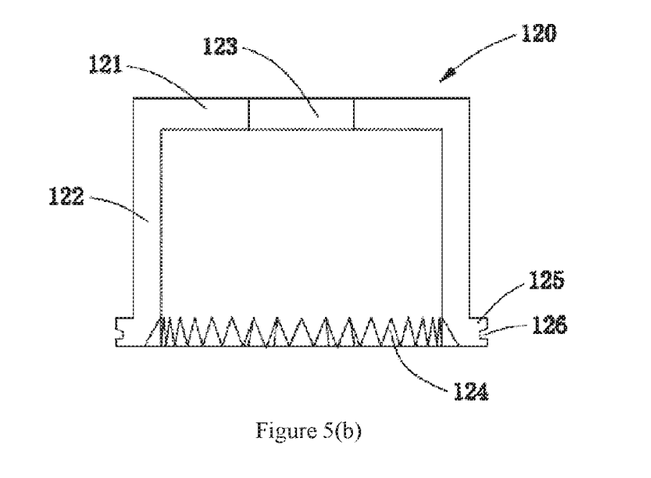

FIGS. 5(a) and 5(b) are schematic bottom view and side sectional view of the housing structure of the battery lock-up device in FIG. 1, respectively. The sectional view of FIG. 5(b) is taken by passing through the center of the second connection hole 123 of the housing structure 120 in FIG. 5(a).

The housing structure 120 is fixed to the battery housing 300 of the power battery by means of welding or the like. The housing structure 120 has a circular top plate 121 and a circumferential side wall 122 extending from one side of the top plate 121. The top plate 121 and the circumferential side wall 122 forming a cavity in which the pillar portion of the press plate, the nut and the anti-rotation locking member are adapted to be accommodated as shown. The second connection hole 123 is a through hole at the center of the top plate 121, which is adapted to be passed by the pillar portion 131 of the press plate 130, but the head portion 131 of the press plate 130 is restricted from passing through the through hole.

As shown, a distal end of the circumferential side wall 122 of the housing structure 120 is formed with an outward turn-up 125, and a circumferential outer side face of the turn-up 125 is formed with a circumferential extending groove 126. In addition, cone slots 124 distributed along the inner circumference are also formed at the turn-up of the housing structure 120 (on the inner side), for engaging with the anti-rotation locking member 150 to prevent a relative rotation thereof.

Figure 6:
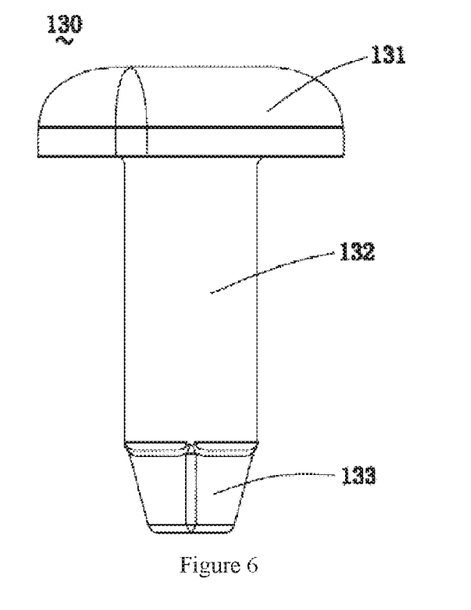
FIG. 6 is a schematic perspective view of a press plate of the battery lock-up device in FIG. 1.

FIG. 6 is a schematic perspective view of the press plate of the battery lock-up device in FIG. 1. As can be seen from the drawing, the press plate 130 comprises a head portion 131, a pillar portion 131 and a distal end 133 that are integral. An upper part of the press plate 130 is the head portion 131 of the press plate, which is used for mating with the dual limited position structure 112 on the connection bracket 110 for realizing locking or unlocking; a middle columnar threaded part mates with the nut 140; the lower part is a truncated multilateral pyramid (a quadrilateral pyramid in the illustrated example) which has a guide feature for mating with a rotational operation tool in a battery swap station. In the illustrated embodiment, simply by rotating the head portion 131 of the press plate 130 by 90° using the rotational operation tool in a battery swap station, the position of the head portion 131 of the press plate 130 in the dual limited position structure can be shifted, thus quickly detaching or installing the power battery.

In the illustrated embodiment, the bottom of the head portion 131 of the press plate 130 employs a long quadrilateral shape. Those skilled in the art can conceive that other regular profiles can be also employed for the bottom; accordingly, the first limited position and the second limited position on the connection bracket 110 may also employ a shape corresponding to the regular profile. The regular profile should be a non-circular shape.

The distal end 133 of the pillar portion 132 in the drawing can be of a truncated multilateral pyramid shape. A pyramid inclination enables an operation tool to provide a guidance when it engages the distal end 133 so that convenience is provided to the operation of tool. It can be conceived that in other embodiments, the multilateral pyramid shape can be of a pyramid shape having three or five laterals or other number of laterals.

Figure 7A:
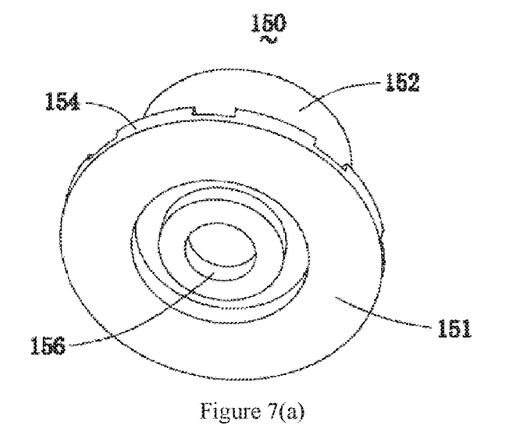
FIGS. 7(a), 7(b) and 7(c) are schematic perspective view, side sectional view and top view of an anti-rotation locking member of the battery lock-up device in FIG. 1, respectively.
Figure 7B:
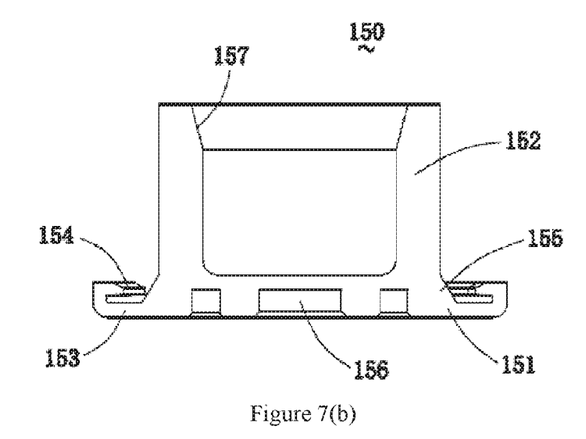
Figure 7C:
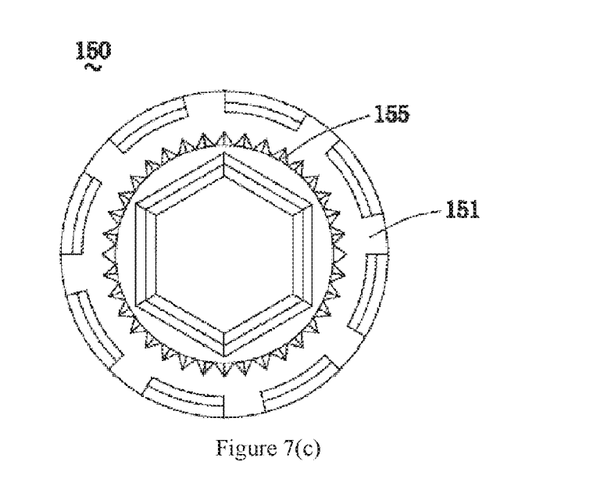

FIGS. 7(a), 7(b) and 7(c) are schematic perspective view, side sectional view and top view of the anti-rotation locking member 150 of the battery lock-up device in FIG. 1, respectively.

As shown in the drawings, the anti-rotation locking member 150 can be of a circular cover shape, and can comprise a cover plate 151 and a circumferential side wall 152 extending from a first side of the cover plate 151.

The cover plate 151 can have a flange 153 extending to the outside of the circumferential side wall 152, and an outer circumference of the flange 153 is formed with a holding portion 154 adapted to engage with the housing structure. In the illustrated embodiment, the holding portion 154 on the flange 153 of the anti-rotation locking member 150 is an inner turn-up adapted to engage with the groove of the housing structure and arranged in sections. In an assembled state, the inner turn-up can engage with the groove 126 in the housing structure 120. Due to the resilience at the inner turn-up, when the anti-rotation locking member 150 is pressed into the housing structure 120, the inner turn-up will snap-fit into the groove 126; when the anti-rotation locking member 150 leaves the housing structure 120 due to traction, the inner turn-up will disengage from the groove 126.

In order to lock the nut 140 tightly to prevent rotation, the anti-rotation locking member 150 can engage with the nut 140 and the housing structure 120 in an anti-rotation manner.

An inner circumference surface of the circumferential side wall 152 and an outer circumference surface of the nut 140 are adapted to be in form-fit with clearance so that a relative rotation thereof is prevented. In the illustrated embodiment, the inner circumference surface of the circumferential side wall 152 has a hexagonal shape which mates with the hexagonal shape of the nut so that a relative rotation thereof can be restricted in the assembled state. There can be a slight clearance between the inner circumference surface of the circumferential side wall 152 and the outer circumference surface of the nut 140 so as to facilitate the assembling. Based on this example, those skilled in the art can conceive that other suitable shapes can also be used for the outer circumference surface of the nut 140 and the inner circumference surface of the circumferential side wall 152 for mating. A chamfer 157 for guiding purpose is formed at an inner side of a distal end of the circumferential side wall 152 of the anti-rotation locking member 150, so as to prevent an interference between the anti-rotation locking member 150 and the nut 140 during installation, which will cause inconvenience in installation.

In addition, an anti-rotation defining structure 155 is formed at a position where an outer circumference surface of the circumferential side wall 152 and the flange are joined, and the anti-rotation defining structure 155 engages with the housing structure 120 so that a relative rotation thereof is prevented. In the illustrated embodiment, the anti-rotation defining structure 155 can be in the form of cone teeth. When the anti-rotation locking member 150 is assembled in the housing structure 120, the cone teeth are adapted to engage with cone slots 124 distributed along the inner circumference at the turn-up of the housing structure 120, thus locking a relative rotation between them.

Moreover, in order to facilitate detaching the anti-rotation locking member 150 from the housing structure 120, a traction structure 156 can be formed at a second side of the cover plate 151. In the illustrated example, the traction structure 156 can be a groove or a through hole. The groove or through hole can mate with an operation tool in the battery swap platform. After the operation tool is connected with the internal thread by rotation, the operation tool moves downward to remove the anti-rotation locking member 150 so that a quick detaching and installing of the device can be realized. It can be understood that preferably, the groove is used herein, which can realize the functions of anti-dust and water-proof, etc. Herein, other specific structures for the traction structure 156 are not excluded, for example but not limited to, a pull ring or the like, which are not listed one by one herein.

Figure 8:
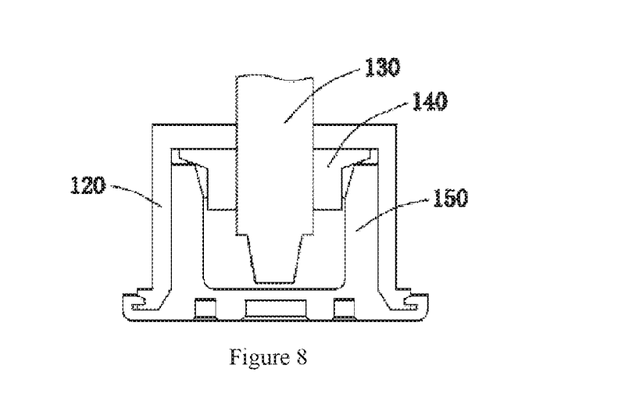
FIG. 8 is a schematic view showing anti-rotation of the battery lock-up device in FIG. 1.

FIG. 8 is a schematic view showing anti-rotation of the battery lock-up device in FIG. 1.

It can be known from FIG. 8 that in the invention, the locking nut 140 is designed to have an anti-rotation structure so as to prevent torque attenuation; as shown, an internal hexagon of the anti-rotation locking member 150 mates with an external hexagon of the nut 140. A root of the anti-rotation locking member 150 is designed to have a tooth-like structure (preferably, the cone teeth in the example) for mating with a tooth-like groove at the root of the housing structure 120 (preferably, the cone groove in the example), and meanwhile a guide design is also provided. The bottom edge of the anti-rotation locking member 150 is designed to be an inner turn-up for mating with the groove at the bottom outer edge of the housing structure 120 so as to realize anti-rotation of the nut 140 and position limitation of the anti-rotation locking member 150. An internal hexagonal recess of the anti-rotation locking member 150 mates with the external hexagon of the nut 140, and a certain clearance is left. Meanwhile, a guide structure is provided, which can not only realize anti-rotation, but also can absorb the assembly tolerance and seal.

Through the above description of the battery lock-up device in connection with the drawings, those skilled in the art can implement a new energy vehicle having a power battery installed by using the battery lock-up device of the invention. It can be understood that a typical example of the new energy vehicle is new energy automobile. In an alternative embodiment, the connection bracket of the battery lock-up device can be connected to the body (especially the chassis) of the new energy automobile, and/or the housing structure of the battery lock-up device can be fixed to the battery housing of the power battery, e.g., battery frame.

Further, those skilled in the art can understand that in a method for installing/detaching a power battery onto/from a new energy vehicle by using the battery lock-up device of the invention, the installing steps comprise: (1) bringing a power battery having the battery lock-up device to an installation position; (2) rotating the press plate of the power battery so that the press plate is aligned with the first connection hole of the connection bracket; (3) passing the head portion of the press plate through the first connection hole and using the rotational operation tool to rotate the press plate until the head portion of the press plate into the first limited position; (4) tightening the nut; and (5) installing the anti-rotation locking member between the housing structure and the nut; and/or, the detaching steps comprise: (1) detaching the anti-rotation locking member, (2) loosening the nut; (3) pushing the press plate upwardly; (4) using the rotational operation tool to rotate the head portion of the press plate to the second limited position; and (5) lowering the battery lock-up device and the power battery, and then removing them.

The battery lock-up device of the invention is a quick battery swapping and locking device for the power battery of new energy vehicle, which has a simple and compact structure, a high reliability and a high utilization rate of space. By means of cooperating with the battery swap platform, a good technical effect can be realized. In an operation mode of quick battery swap of new energy vehicle such as automobile, the battery can be swapped quickly and efficiently.

The technical scope of the invention is not merely limited to the content of the above description. Those skilled in the art can make various variations and modifications to the above embodiments under the premise of not departing from the technical ideas of the invention, these variations and modifications shall all fall within the scope of the invention.

What is claimed is:

1. A battery lock-up device for new energy vehicle, characterized in that the battery lock-up device comprises:
a connection bracket adapted to be connected to the new energy vehicle, the connection bracket having a first connection hole and a dual limited position structure located at the first connection hole, the dual-stop structure comprising a first limited position and a second limited position;
a housing structure adapted to be fixed to a power battery of the new energy vehicle, the housing structure having a second connection hole thereon;
a press plate and a nut, the press plate comprising a head portion and a pillar portion extending from the head portion and adapted to pass through the first connection hole and the second connection hole, the pillar portion being formed with a threaded portion for engaging with the nut, and the pillar portion having a distal end adapted to mate with a rotational operation tool; and
a detachable anti-rotation locking member, which locks the nut against the housing structure;
wherein when the press plate is at the first limited position, the press plate and the nut which is engaged on the threaded portion lock-up the connection bracket and the housing structure; and when the press plate reaches the second limited position, the head portion of the press plate can exit from the connection bracket via the first connection hole so that the connection bracket and the housing structure are unlocked.

2. The battery lock-up device according to claim 1, wherein the anti-rotation locking member is of a circular cover shape, and comprises a cover plate and a circumferential side wall extending from a first side of the cover plate, an inner circumference surface of the circumferential side wall and an outer circumference surface of the nut are adapted to be in form-fit with a clearance so that a relative rotation thereof is prevented;
the cover plate has a flange extending to the outside of the circumferential side wall, and an outer circumference of the flange is formed with a holding portion adapted to engage with the housing structure;
an anti-rotation defining structure is formed at a position where an outer circumference surface of the circumferential side wall and the flange are joined, and the anti-rotation defining structure engages with the housing structure so that a relative rotation thereof is prevented; and a traction structure is formed at a second side of the cover plate.

3. The battery lock-up device according to claim 2, wherein a chamfer for guiding purpose is formed at an inner side of a distal end of the circumferential side wall of the anti-rotation locking member.

4. A new energy vehicle, wherein the new energy vehicle has a power battery installed by using the battery lock-up device according to claim 3.

5. A method for installing/detaching a power battery onto/from a new energy vehicle by using the battery lock-up device according to claim 3, wherein the installing steps comprise: bringing a power battery having the battery lock-up device to an installation position; rotating the press plate of the power battery so that the press plate is aligned with the first connection hole of the connection bracket; passing the head portion of the press plate through the first connection hole and using the rotational operation tool to rotate the press plate until the head portion of the press plate into the first limited position; tightening the nut; and installing the anti-rotation locking member between the housing structure and the nut; and/or, the detaching steps comprise: detaching the anti-rotation locking member, loosening the nut; pushing the press plate upwardly; using the rotational operation tool to rotate the head portion of the press plate to the second limited position; and lowering the battery lock-up device and the power battery and then removing them.

6. A method for installing/detaching a power battery onto/from a new energy vehicle by using the battery lock-up device according to claim 3, wherein the installing steps comprise: bringing a power battery having the battery lock-up device to an installation position; rotating the press plate of the power battery so that the press plate is aligned with the first connection hole of the connection bracket; passing the head portion of the press plate through the first connection hole and using the rotational operation tool to rotate the press plate until the head portion of the press plate into the first limited position; tightening the nut; and installing the anti-rotation locking member between the housing structure and the nut; and/or, the detaching steps comprise: detaching the anti-rotation locking member, loosening the nut; pushing the press plate upwardly; using the rotational operation tool to rotate the head portion of the press plate to the second limited position; and lowering the battery lock-up device and the power battery and then removing them.

7. The battery lock-up device according to claim 2, wherein the housing structure has a circular top plate and a circumferential side wall extending from one side of the top plate, a distal end of the circumferential side wall of the housing structure is formed with an outward turn-up, and a circumferential outer side face of the turn-up is formed with a circumferential extending groove; the holding portion on the flange of the anti-rotation locking member is an inner turn-up adapted to engage with the groove and arranged in sections.

8. The battery lock-up device according to claim 7, wherein the anti-rotation defining structure is cone teeth which are in form-fit with cone slots distributed along the inner circumference at the turn-up of the housing structure.

9. A method for installing/detaching a power battery onto/from a new energy vehicle by using the battery lock-up device according to claim 7, wherein the installing steps comprise: bringing a power battery having the battery lock-up device to an installation position; rotating the press plate of the power battery so that the press plate is aligned with the first connection hole of the connection bracket; passing the head portion of the press plate through the first connection hole and using the rotational operation tool to rotate the press plate until the head portion of the press plate into the first limited position; tightening the nut; and installing the anti-rotation locking member between the housing structure and the nut; and/or, the detaching steps comprise: detaching the anti-rotation locking member, loosening the nut; pushing the press plate upwardly; using the rotational operation tool to rotate the head portion of the press plate to the second limited position; and lowering the battery lock-up device and the power battery and then removing them.

10. The battery lock-up device according to claim 2, wherein the traction structure is a groove or through hole having an internal thread.

11. A new energy vehicle, wherein the new energy vehicle has a power battery installed by using the battery lock-up device according to claim 2.

12. A method for installing/detaching a power battery onto/from a new energy vehicle by using the battery lock-up device according to claim 2, wherein the installing steps comprise: bringing a power battery having the battery lock-up device to an installation position; rotating the press plate of the power battery so that the press plate is aligned with the first connection hole of the connection bracket; passing the head portion of the press plate through the first connection hole and using the rotational operation tool to rotate the press plate until the head portion of the press plate into the first limited position; tightening the nut; and installing the anti-rotation locking member between the housing structure and the nut; and/or, the detaching steps comprise: detaching the anti-rotation locking member, loosening the nut; pushing the press plate upwardly; using the rotational operation tool to rotate the head portion of the press plate to the second limited position; and lowering the battery lock-up device and the power battery and then removing them.

13. The battery lock-up device according to claim 1, wherein the connection bracket has a first side wall and a second side wall that are substantially perpendicular to each other, the first side wall is formed with an installation hole for connecting to the new energy vehicle, and the second side wall is provided with the dual limited position structure and the first connection hole.

14. The battery lock-up device according to claim 13, wherein the first connection hole and a bottom face of the head portion of the press plate have consistent long quadrilateral shapes.

15. The battery lock-up device according to claim 14, wherein the first limited position is an anti-loosening groove on the surface of the second side wall that is perpendicular to the first connection hole, and the second limited position is a shoulder for maintaining the head portion of the press plate aligned with the first connection hole.

16. The battery lock-up device according to claim 1, wherein the distal end of the pillar portion has a truncated multilateral pyramid shape.

17. A new energy vehicle, wherein the new energy vehicle has a power battery installed by using the battery lock-up device according to claim 1.

18. The new energy vehicle according to claim 17, wherein the new energy vehicle is a new energy automobile.

19. The new energy vehicle according to claim 18, wherein the connection bracket of the battery lock-up device is connected to the body of the new energy automobile, and/or the housing structure of the battery lock-up device is fixed to a battery housing of the power battery.

20. A method for installing/detaching a power battery onto/from a new energy vehicle by using the battery lock-up device according to claim 1, wherein the installing steps comprise: bringing a power battery having the battery lock-up device to an installation position; rotating the press plate of the power battery so that the press plate is aligned with the first connection hole of the connection bracket; passing the head portion of the press plate through the first connection hole and using the rotational operation tool to rotate the press plate until the head portion of the press plate into the first limited position; tightening the nut; and installing the anti-rotation locking member between the housing structure and the nut; and/or, the detaching steps comprise: detaching the anti-rotation locking member, loosening the nut; using the rotational operation tool to rotate the head portion of the press plate to the second limited position; and lowering the battery lock-up device and the power battery and then removing them.

* * * * *

UNITED STATES PATENT AND TRADEMARK OFFICE
CERTIFICATE OF CORRECTION

PATENT NO. : 10,763,474 B1
APPLICATION NO. : 15/751740
DATED : September 1, 2020
INVENTOR(S) : Changjiu Yin et al.

Page 1 of 1

It is certified that error appears in the above-identified patent and that said Letters Patent is hereby corrected as shown below:

In the Claims

In Claim 20, Column 13, Line 11, delete "loosening the nut;" and insert --loosening the nut; pushing the press plate upwardly--

Signed and Sealed this
Fifteenth Day of December, 2020

Andrei Iancu
*Director of the United States Patent and Trademark Office*